United States Patent
Goldman

(10) Patent No.: US 7,810,024 B1
(45) Date of Patent: Oct. 5, 2010

(54) EFFICIENT ACCESS TO TEXT-BASED LINEARIZED GRAPH DATA

(75) Inventor: Oliver Goldman, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 885 days.

(21) Appl. No.: 10/107,102

(22) Filed: Mar. 25, 2002

(51) Int. Cl.
G06N 3/00 (2006.01)
(52) U.S. Cl. .................................................. 715/234
(58) Field of Classification Search ................. 715/513, 715/517, 532, 853, 523, 530, 234, 243, 254
See application file for complete search history.

(56) References Cited

U.S. PATENT DOCUMENTS

| | | | | |
|---|---|---|---|---|
| 5,845,305 | A * | 12/1998 | Kujiraoka | 715/532 |
| 6,073,144 | A * | 6/2000 | van Hoff | 715/513 |
| 6,101,512 | A | 8/2000 | DeRose et al. | |
| 6,339,780 | B1 * | 1/2002 | Shell et al. | 715/526 |
| 6,418,403 | B2 * | 7/2002 | Fuji | 704/10 |
| 6,584,459 | B1 * | 6/2003 | Chang et al. | 707/3 |
| 6,631,379 | B2 | 10/2003 | Cox | 707/100 |
| 6,643,653 | B1 * | 11/2003 | Chu | 707/10 |
| 6,654,761 | B2 * | 11/2003 | Tenev et al. | 707/102 |
| 7,019,864 | B2 * | 3/2006 | Delhoune et al. | 358/1.18 |
| 2001/0049675 | A1 * | 12/2001 | Mandler et al. | 707/1 |
| 2002/0062311 | A1 | 5/2002 | Kircher | 707/3 |
| 2002/0099745 | A1 * | 7/2002 | Huck et al. | 707/532 |
| 2003/0066033 | A1 * | 4/2003 | Direen et al. | 715/513 |
| 2003/0101169 | A1 | 5/2003 | Bhatt et al. | 707/3 |
| 2004/0015840 | A1 | 1/2004 | Walker | 717/108 |
| 2004/0205549 | A1 | 10/2004 | Yassin et al. | 715/513 |
| 2004/0205552 | A1 | 10/2004 | Vosburgh | 715/513 |

FOREIGN PATENT DOCUMENTS

WO    WO94/14122    6/1994

OTHER PUBLICATIONS

U.S. Appl. No. 60/318,956, filed Sep. 13, 2001.*
Clark, "DOM and SAX are Dead, Long Live DOM and SAX," Nov. 14, 2001, <http://www.xml.com/lpt/a/2001/11/14/dom-sax.html>, pp. 1-7.*
Hors, et al. "Document Object Model Core," Nov. 13, 2000, <http://www.w3.org/TR/DOM-Level-2-Core/core.html>, pp. 1-71.*

(Continued)

Primary Examiner—Kyle R Stork
(74) Attorney, Agent, or Firm—Fish & Richardson P.C.

(57) ABSTRACT

Methods and apparatus implementing systems and techniques for accessing text-based linearized graph data. In general, in one aspect, a method includes obtaining text-based linearized graph data representing a data structure having nodes, and generating node-traversal data for the text-based linearized graph data, where the node-traversal data identifies for each of a subset of nodes in the represented data structure one or more locations in the text-based linearized graph data corresponding to one or more other nodes in the represented data structure, and associating the node-traversal data with the text-based linearized graph data. For example, linear offsets can be added to a document including text-based linearized graph data, such as an XML document, to enable random access to the represented nodes without having to parse the entire document, and without interfering with the generally understood structure and content of the document.

12 Claims, 5 Drawing Sheets

OTHER PUBLICATIONS

"Unicode in XML and other Markup Languages: Unicode Technical Report #20," Feb. 18, 2002, <http://www.w3.org/TR/2002/NOTE-unicode-xml-20020218/>, pp. 1-33.*

"Two-part Addresses and Memory Segmentation," Aug. 7, 2001, <http://web.archive.org/web/20010807224345/http://homepage.smc.edu/morgan_david/cs40/segmentation.htm>, pp. 1-5.*

"Document Object Model (DOM) Level 3 Abstract Schemas and Load and Save Specifications," www.w3.org/TR/DOM-Level-3-ASLS Version 1, W3C Working Draft, Jan. 14, 2002.

"Document Object Model Load and Save," Oct. 25, 2001, www.w3.org/TR/2001/WD-DOM-Level-3-ASLS-20011025/load-save.html.

"Scripts" (in HTML documents), www.w3.org/TR/html4/interact/scripts.html, Feb. 28, 2002.

"HOWTO: Retrieve XML Data Asynchronously with ondataavailable Event (Q285874)," http://support.microsoft.com/default.aspx?scid=kb;EN-US;q285874, Feb. 28, 2002.

"Microsfot XML Core Services (MSXML) 4.0—DOM Reference, readyState Property (DOMDocuments)," http://msdn.microsoft.com/library/en-us/xmlsdk/htm/xml_pro_pr_2rlw.asp?frame=true, Dec. 20, 2001.

Microsfot XML Core Services (MSXML) 4.0—DOM Reference, getAttribute Method, http://msdn.microsoft.com/library/en-us/xmlsdk/htm/xml_mth_dg_5rfo.asp?frame=true, Dec. 20, 2001.

Microsfot XML Core Services (MSXML) 4.0—DOM Developer's Guide, Getting and Setting Parse Flags, http://msdn.microsoft.com/library/en-us/xmlsdk/htm/dom_howdoi_58ab.asp?frame=true, Dec. 20, 2001.

Augusti, "Parsing and DOM-Tree Building with JavaScript", Apr. 13, 2001, <http://www.oreillynet.com/lpt/a/766>, pp. 1-5.

Brownell, "Top Ten SAX2 Tips", Dec. 5, 2001, <http://www.xml.com/lpt/a/2001/12/05/sax2.html>, pp. 1-13.

Chappell, et al. "Benchmarking JMS-Based E-Business Messaging Providers", Mar. 1, 2001, <http://www.syscon.com/story/?storyid=36219&DE=1>, pp. 1-13.

Dodds, "Storing and Querying", Apr. 5, 2000, <http://www.xml.com/lpt/a/2000/04/05/deviant/index.html>, pp. 1-4.

Dumbill, "Quilt Has Querying Covered", Jun. 13, 2002, <http://www.xml.com/lpt/a/2000/06/xmleurope/quilt.html>, pp. 1-3.

Euzenat, et al. "XML Transformation Flow Processing", 2001, <http://www.transmorpher.inrialpes.fr/wpaper/>, pp. 1-20.

Hampton, "High Performance XML Parsing with SAX", Feb. 14, 2001, <http://www.xml.com/lpt/a/2001/02/14/perlsax.html>, pp. 1-6.

Idris, "Should I Use SAX or DOM?", May 22, 1999, <http://developerlife.com/saxvsdom/default.html>, pp. 1-5.

"Perl XML Quickstart: The Standard XML Interfaces", May 16, 2001, <http://www.xml.com/lpt/a/2001/05/16/perlxml.html>, pp. 1-6.

Rodriguez, "Processing XML with Perl.", Apr. 5, 2000, <http://www.xml.com/lpt/a/2000/04/05/feature/index.html>, pp. 1-9.

"Sax-Like Event Handlers for the Generic Parsing of ASN.1 Encoded Data", Feb. 2001, Objective Systems, Inc., pp. 1-9.

Sedgewick, "Algorithms in C", 1998, Addison-Wesley, $3^{rd}$ Edition, pp. 105-108.

"The Collected Works of SAX", Jul. 18, 2001, <http://www.xml.com/lpt/a/2001/07/18/collectedsax.html>, pp. 1-4.

Walsh, "Getting Started with XML Programming, Part II", May 5, 1999, <http://www.xml.com/lpt/a/norm/part2/getstart2.html>, pp. 1-8.

"Writing SAX Drivers for Non-XML Data", Sep. 19, 2001, <http://www.xml.com/lpt/a/2001/09/19/sax-non-xml-data.html>, pp. 1-9.

* cited by examiner

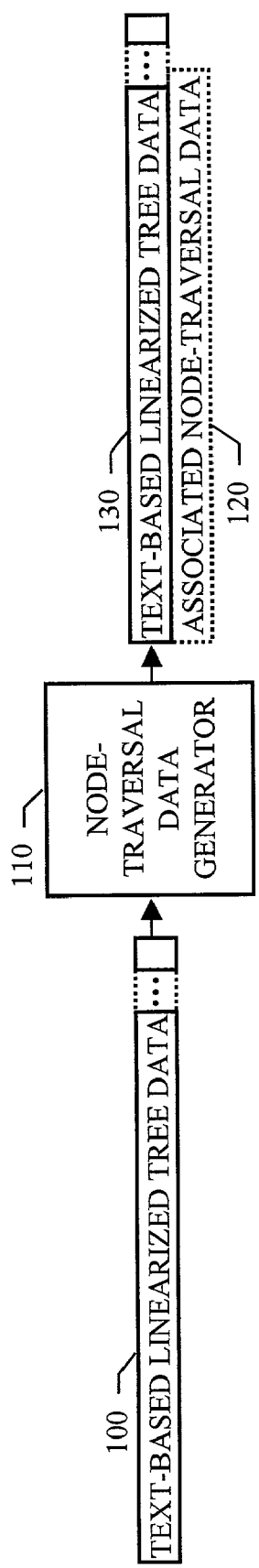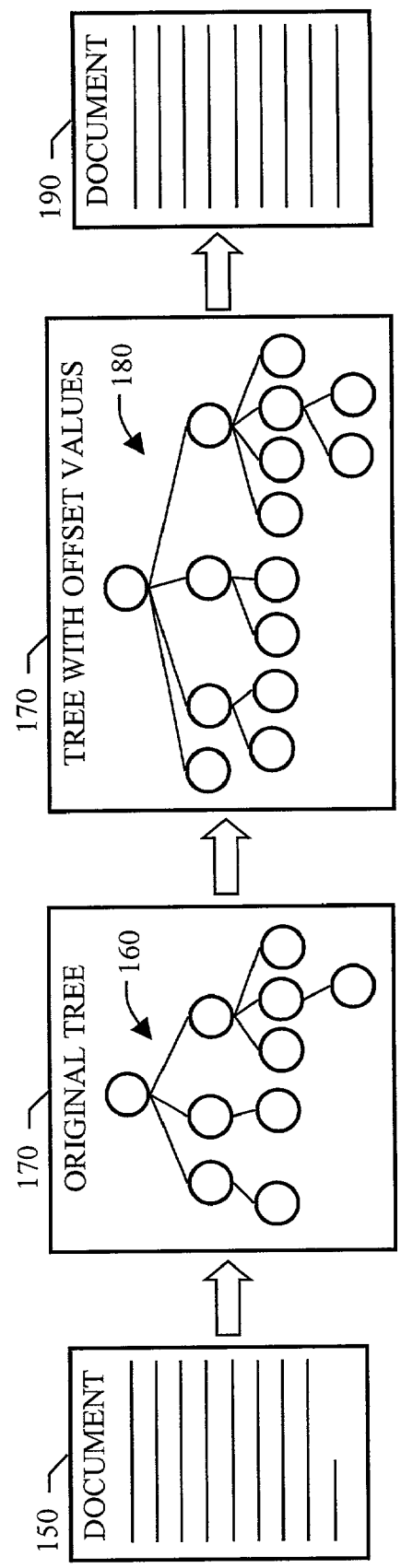

← 210

`<?xml version="1.0"?><node_1_1><node_1_1>data</node_1_1><node_1_2>data<node_1_2>data</node_1_2><node_1_3_1>inforamtion</node_1_3_1>data</node_1_3>`

`</node_1>`

`<?xml version="1.0"?><node_1 offsets='0000'><node_1_1 offsets='00B0'>data<node_1_1_1 offsets='0000'>data</node_1_1_1></node_1_1><node_1_2 offsets='0100'>data</node_1_2><node_1_3 offsets='0000'>`

`data<node_1_3_1 offsets='0000'>inforamtion</node_1_3_1>data</node_1_3></node_1>`

`<?xml version="1.0"?><node_1 offsets='28,00'>data<node_1_1 offsets='001B'>data<node_1_1_1 offsets='0000'>data</node_1_1_1></node_1_1><node_1_2 offsets='2800'>data</node_1_2><node_1_3 offsets='001D'>`

`data<node_1_3_1 offsets='0000'>inforamtion</node_1_3_1>data</node_1_3></node_1>`

FIG. 2C

EFFICIENT ACCESS TO TEXT-BASED LINEARIZED GRAPH DATA

BACKGROUND

The present invention relates to accessing text-based data in electronic documents.

A document can be represented and stored in many different formats. Common formats include those defined by markup languages. For example, SGML (Standard Generalized Markup Language) defines a general grammar for descriptive markup of Unicode or ASCII (American Standard Code for Information Interchange) text, where angle brackets are used to specify tags defining the semantic value of data. In the context of the World Wide Web (Web), HTML (Hypertext Markup Language) is a markup language, which is derived from SGML, that is commonly used to define how linked electronic documents should look when presented as pages on a display device or when printed.

HTML generally describes how data should be displayed and mixes data semantics with data presentation information. XML (eXtensible Markup Language) describes information, generally addressing data semantics while ignoring issues of presentation and formatting, which are left to XHTML (Extensible HTML) documents. XML documents are extensible; the underlying grammar is defined by the World Wide Web Consortium (W3C), but the tags can be defined by users of XML.

XML documents can be accessed using defined Application Program Interfaces (APIs). For example, the SAX (Simple API for XML) API is an event-based interface designed for linear access to XML documents. A parsing process (parser/producer) parses an XML document and provides a client process (consumer) with a stream of events as the producer parses the XML document. In contrast, DOM (Document Object Model) API is an interface designed for random access to XML documents. A producer parses an XML document and, once parsing is complete, provides a client with read-write random access to a logical tree data structure (the DOM) representing the XML document.

The documentElement is the top-level (root) of the tree, and this element has one or more childNodes (tree branches). A Node Interface Model is used to access the individual elements in the node tree. As an example, the childNodes property of the documentElement can be accessed with a for/each construct to enumerate each individual node. The Node Interface Model is defined by W3C and includes definitions of the functions needed to traverse the node tree, access the nodes and their attribute values, insert and delete nodes, and convert the node tree back to XML.

SUMMARY

The present application describes systems and techniques for accessing text-based linearized graph data. In general, in one aspect, a method includes obtaining text-based linearized graph data representing a data structure having nodes, and generating node-traversal data for the text-based linearized graph data, where the node-traversal data identifies for each of a subset of nodes in the represented data structure one or more locations in the text-based linearized graph data corresponding to one or more other nodes in the represented data structure. The method further includes associating the node-traversal data with the text-based linearized graph data.

The text-based linearized graph data can be expressed in a text-based format that conforms to rules defined by a metalanguage. The text-based linearized graph data can be text-based linearized tree data, such as XML data, which can be encoded in Unicode. Associating the node-traversal data with the text-based linearized graph data can include incorporating the node-traversal data into the text-based linearized graph data to provide for random access to the nodes represented in the text-based linearized graph data, where the resulting text-based linearized graph data still conforms to the rules defined by the metalanguage. Incorporating the node-traversal data into the text-based linearized graph data can involve adding storage locations, such as node attributes, to the nodes represented in the text-based linearized graph data to store the node-traversal data in the text-based linearized graph data.

Obtaining the text-based linearized graph data can involve accessing a file on disk or receiving a network data stream, and parsing the data using an event-based parser, such as SAX, or using a document object model interface, such as DOM API. Obtaining the text-based linearized graph data can also involve producing a data structure in memory. Generating node-traversal data can involve totaling storage units for the nodes to create offset values specifying relative positions of the nodes represented in the text-based linearized graph data. The offset values can be relative to other nodes or a fixed point, such as the beginning of the data, and the offset values can include one or more of a parent offset value, a next-sibling offset value, a previous-sibling offset value and a first-child offset value, or other offset values, which can be tailored to a specific data set.

A subset of the node-traversal data can be used to traverse the nodes represented in the text-based linearized graph data, and/or to merge two sets of text-based linearized graph data. Thus, in another aspect, a method includes obtaining text-based linearized tree data representing a tree data structure having nodes expressed in a text-based format that conforms to rules defined by a metalanguage, where the text-based linearized tree data includes linear offset values specifying relative linear positions of the nodes represented in the text-based linearized tree data. The method further includes traversing the nodes represented in the text-based linearized tree data using at least a portion of the linear offset values to avoid parsing a portion of the text-based linearized tree data, such as by skipping over portions of the text-based linearized tree data.

The text-based linearized tree data can include data and tags defining semantic value for the data, where the tags include element tags and attribute tags and the attribute tags include offset tags identifying the linear offset values. The metalanguage can be XML. Additionally, the method can further include tracking changes made to the text-based linearized tree data and updating at least a portion of the linear offset values.

Thus, for example, linear offsets can be added to text-based linearized graph data that conforms to rules defined by a metalanguage such that the resulting text-based linearized graph data still conforms to the rules defined by the metalanguage. Offset attributes can be added to an XML document to enable random access to the represented nodes without having to parse the entire XML document, and without interfering with the generally understood structure and content of the XML document. The offsets can include offset values that indicate distances, such as byte and/or character distances, from a current node to one or more other nodes, such as a previous-sibling element node, next-sibling element node, parent element node, or first-child element node in text-based linearized tree data (i.e., a document tree). When the document is accessed, these offset values can be used to follow the document tree without requiring that the entire tree be parsed. Since the document does not need to be parsed into a full document tree, the document can be efficiently accessed, such as by skipping ahead to desired portions of a file stored on disk or other storage device.

In another aspect, a method includes obtaining text-based linearized tree data representing a tree data structure having nodes, where the text-based linearized tree data is expressed in a text-based format that leaves lengths of the represented nodes undefined and that conforms to rules defined by a metalanguage. The method further includes generating linear offset values specifying relative linear positions for the nodes represented in the text-based linearized tree data, and incorporating the generated linear offset values into the text-based linearized tree data, where the resulting text-based linearized tree data still conforms to the rules defined by the metalanguage.

Generating the linear offset values can involve traversing the nodes of a tree data structure produced in memory using a document object model interface, and totaling storage units for the nodes and for offset-value storage locations to be added to the text-based linearized tree data. Incorporating the generated linear offset values into the text-based linearized tree data can involve inserting the generated linear offset values into the tree data structure in memory using the document object model interface, and writing the tree data structure to a text file as text-based linearized tree data that conforms to the rules defined by the metalanguage.

In additional aspects, a method includes transmitting text-based linearized graph or tree data such as described above. The offsets included in the text-based linearized data enable random access to the represented nodes. An electronic document, which is storable on a machine-readable medium, includes text-based linearized graph or tree data such as described above. The text-based linearized data can represent pages of a written work, such an electronic book or an electronic encyclopedia, or other data sets, such as accounting data, Web viewing data, scientific data, etc. Moreover, implementations of the systems and techniques described here can occur in hardware, software or a combination of both, and can include machine instructions for causing a machine to perform the operations described.

The invention can be implemented to realize one or more of the following advantages. The systems and techniques described can result in efficient access to text-based linearized graph data, such as XML documents, by enabling random access to the text-based linearized graph data without requiring all the data to be parsed and loaded into memory. Thus, a portion of a large XML document can be accessed quickly in a random access fashion, without having to parse the entire document. Moreover, merger of text-based linearized graph data can be performed faster, and changes to text-based linearized graph data can be tracked and corresponding node-traversal data updated.

With many documents, text-based linearized graph or tree data can be used to store and transmit the documents. This document format enables easy interchange between various software applications. But as these documents become larger, such as with electronic encyclopedias and databases stored as text-based linearized tree data, access to data can be slowed considerably. The systems and techniques described here allow a software application to efficiently and quickly access such large documents, while retaining the interchange capabilities of the underlying document format. With the addition of appropriate tracking and updating as described, efficient and randomly accessible text-based document trees can be maintained and exchanged between software applications.

Details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 1A and 1B are block diagrams illustrating generation of node-traversal data for text-based linearized tree data.

FIGS. 2A, 2B and 2C are block diagrams illustrating XML data and two types of node-traversal data.

Like reference symbols in the various drawings indicate like elements.

DETAILED DESCRIPTION

Figure 3A:
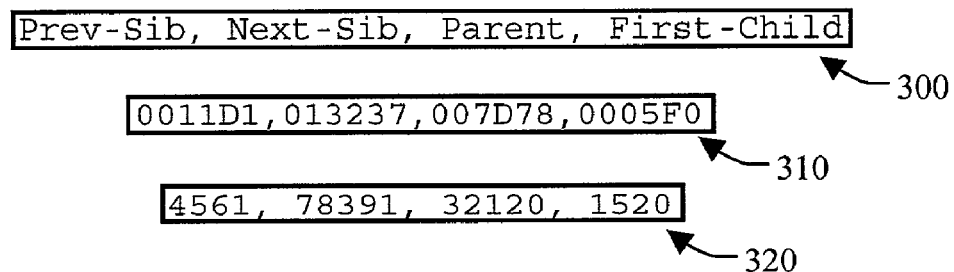
FIG. 3A is a block diagram illustrating an additional example of node traversal data.

The systems and techniques described here relate to accessing text-based linearized graph data, for example, accessing an XML document using embedded offset attributes. The description that follows discusses document access in the contexts of text-based linearized tree data and XML documents, but applies equally in other contexts. For example, the systems and techniques described in connection with text-based linearized tree data can be applied to text-based linearized graph data generally.

FIGS. 1A and 1B are block diagrams illustrating generation of node-traversal data for text-based linearized tree data. As shown in FIG. 1A, text-based linearized tree data 100 is obtained, such as from a storage device or from a network connection, by a node-traversal data generator 110. The text-based linearized tree data 100 represents a tree data structure having nodes, and the text-based linearized tree data 100 can be expressed in a text-based format that leaves lengths of the represented nodes undefined and that conforms to rules defined by a metalanguage. For example, the text-based linearized tree data 100 can be an XML document (e.g., a document conforming to version 1.0 of the Extensible Markup Language specification) or an HTML document. As used herein, the term "document" means a set of electronic data, including both electronic data stored in a file and electronic data received over a network, and including data languages representing pages of a written work (e.g., a data repository encoding an electronic book or an electronic encyclopedia) or other data languages (e.g., a data repository encoding accounting data, Web viewing data, scientific data, or other data sets). An electronic document does not necessarily correspond to a file. A document may be stored in a portion of a file that holds other documents, in a single file dedicated to the document in question, or in a set of coordinated files.

The node-traversal data generator 110 processes the text-based linearized tree data 100 to produce associated node-traversal data 120 that uses the same text-based format and can be stored and/or transmitted separately. The node-traversal data 120 identifies locations in the text-based linearized tree data 100 that correspond to nodes of the represented tree data structure. The node-traversal data 120 can include linear offset values that specify relative linear positions for represented nodes. Moreover, the node-traversal data 120 can be incorporated into the text-based linearized tree data 100 to created new text-based linearized tree data 130. For example, the new text-based linearized tree data 130 can be a new XML document that includes linear offset attributes storing the linear offset values.

The node-traversal data generator 110 can operate on a network data stream or on a stored file. Additionally, the node-traversal generator 110 can work directly with the text data, such as by using an event-based parser, or can generate the tree data structure represented by the text-based linearized tree data 100 to facilitate processing. FIG. 1B illustrates this latter case.

A document 150, containing text-base linearized tree data, is received and the original tree 160 represented in the document 150 is created in memory 170. The tree 160 is then traversed to generated offset values, which are then stored in the tree 160 to create a new tree 180. This new tree 180 can then be written to a new document 190 as text-based linearized tree data. If the document 150 came from a file, the new document 190 can be written back into that same file.

In the example shown, a new node is created for each non-leaf node of the original tree 160. However, additional or fewer nodes can be created and different placements within the tree can be created depending upon the implementation. For example, in an XML implementation, all element nodes, or some subset of the element nodes, can have a linear offset added in the form of an offset attribute. This can result in two new nodes (the attribute tag node and the data node) for each element node. Alternatively, the linear offsets can be added as a separate sub-tree within the new tree 180.

FIGS. 2A, 2B and 2C are block diagrams illustrating XML data and two types of node-traversal data. As shown in FIG. 2A, XML data 210 is a type of text-based linearized tree data. The XML data 210 represents a tree data structure having a root node NODE_1, which has three child nodes: NODE_1_1, NODE_1_2, and NODE_1_3. In addition, NODE_1_3 has a child node NODE_1_3_1. These tags have been selected to clarify the framework of the tree data structure represented. In general, an XML document includes data and tags defining semantic value for the data, thus the tags (including both element tags and attribute tags) are typically selected to reflect the type of data being delineated and identified.

FIG. 2B shows the same XML data 210 as new XML data 220 with offset attributes included. In this example, each element node has a single offset value. Each offset value is a four digit hexadecimal number representing the location of the next sibling of the current node. This offset value has been selected because XML stores tree data in depth-first order. Other single type offset values and/or multiple type offset values can be used, such as using only first-child offsets for tree data stored in breadth-first order. Each hexadecimal number is a linear offset value specifying the linear position of the next sibling relative to the beginning of the XML data 220. The XML data 220 is encoded using Unicode (e.g., two bytes per character), and the linear offsets specify byte locations for the beginning of the next-sibling node, with a zero location representing no sibling. Thus, the offset value for NODE_1_1 is hexadecimal (hex) 00B0, which is decimal 176, which identifies the location of the 88th character in the XML data 220, which is the sibling NODE_1_2.

Alternative encoding of linear offsets is also possible. FIG. 2C shows an encoding where two offset values are stored in each linear offset attribute in XML data 230. The first two digits of the offset attribute data represent the next sibling of the current node, and third and fourth digits of the offset attribute data represent the first child of the current node. In this example, the XML data 230 is also encoded using Unicode, but the linear offsets specify character locations for the beginning of the next-sibling node and the first-child node relative to the beginning of the current node. Thus, the first child of NODE_1 is located hex 1B (decimal 27) characters away, the next sibling of NODE_1_1 is located hex 28 (decimal 40) characters away, the next sibling of NODE_1_2 is also located hex 28 (decimal 40) characters away, and the first child of NODE_1_3 is located hex 1D (decimal 29) characters away.

With the XML data 230, information contained in NODE_1_3_1 can be reached quickly without having to parse all of the XML data 230, by parsing and using the offset attributes to skip portions of the XML data 230. In these examples, the amount of data contained in the XML data was kept small to clarify the description. However, in practice the amount of data can be significantly larger, thereby leading to substantial improvements in access time when certain portions of a very large set of XML data are sought.

FIG. 3A is a block diagram illustrating an additional example of node traversal data. This node-traversal data includes four offset values 300: previous-sibling, next-sibling, parent, and first-child. These four offset values 300 can be stored in an XML attribute as comma delimited six digit hexadecimal values 310. These values 310 identify locations corresponding to represented nodes by specifying relative linear character positions in the context of the particular offset value 300. Thus, the previous-sibling and parent values represent linear positions moving backward in the text-based linearized tree data, and the next-sibling and first-child values represent linear positions moving forward in the text-based tree data.

The decimal values for the six digit hexadecimal values 310 are shown as decimal values 320. By using character-based locations and six digit hexadecimal values in Unicode data, sub-trees as large as 33,554,430 bytes can be handled. Alternatively, different numbers of digits and different number systems can be used. For example, instead of using base-16 numbers, base-40 numbers can be used or the character representation of the encoded text data can be ignored entirely and the underlying binary numbers can be used directly (e.g., a couple of two-byte Unicode characters can be used per offset value to span sub-trees over 4 billion bytes long).

Additional types of node-traversal data can be used. This additional node-traversal data can take into account structural characteristics of the text-based linearized tree data. For example, if the text-based linearized tree data represents an electronic encyclopedia, the node-traversal data can include twenty-six initial offset values indicating the locations of corresponding encyclopedia volumes A-Z.

Figure 3B:
FIG. 3B is a block diagram illustrating a streaming approach for generating node-traversal data for text-based linearized tree data.

Moreover, as mentioned above, the node-traversal data can be generated both for text-based linearized tree data stored in a file and for text-based linearized tree data received over a network. In both cases, a streaming approach can be used where only a portion of the text-based linearized tree data is kept in memory at any one time. FIG. 3B is a block diagram illustrating a streaming approach for generating node-traversal data for text-based linearized tree data 350.

The node-traversal data generator discussed above is split into two components: a parser 360 and a new data generator 370. The parser 360 parses the text-based linearized tree data 350, totaling storage units used for the represented nodes as it proceeds. The parser 360 can operate directly on a file stored on a mass storage device or on a memory buffer holding the text-based linearized tree data 350 temporarily. The new data generator 370 waits until an appropriate sub-section of the text-based linearized tree data 350 has been parsed and then proceeds to calculate node-traversal data until that sub-section is completed.

For example, in an XML implementation, the new data generator 370 waits at each element node until the parser 360 either reaches the next sibling or the end of the parent element node. At this point, the new data generator 370 has all the data needed to generate previous-sibling, next-sibling, parent and first-child offsets for the current element node. These generated offsets can also be incorporated directly into the text-based linearized tree data 350 as described above, such as by writing into the file being parsed or transmitting the new text-based linearized tree data with the generated offsets included as the new text-based linearized tree data is generated.

Figure 4:
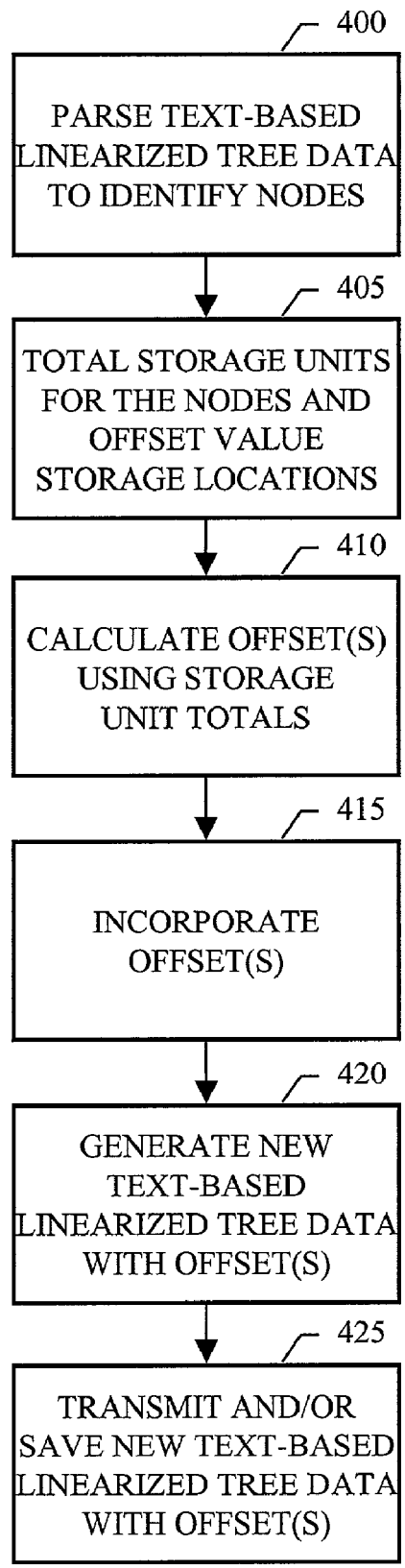
FIG. 4 is a flow chart illustrating an example method of generating offset values for text-based linearized tree data.

FIG. 4 is a flow chart illustrating an example method of generating offset values for text-based linearized tree data. The method begins by parsing text-based linearized tree data, such as XML data, to identify represented nodes (400). A text file or a data stream can be parsed using an event based parser or a document object model interface. For example, an XML document can be loaded using the DOM API to obtain an object model view of the document tree. Alternatively, an object model view can be obtained directly, without parsing the text-based linearized tree data.

Then, storage units for the represented nodes and offset value storage locations are totaled (405). These storage unit totals can be used to create linear offset values specifying relative linear positions of the nodes represented in the text-based linearized tree data. For example, a current offset can be set to zero, and then an in-order traversal of the document tree can be performed. At each element, a new attribute containing the current offset can be added to the document tree, and the number of bytes used to write the element plus its children and the storage locations for new attributes can be recorded.

Next, linear offset values are calculated using the storage unit totals (410). Previous-sibling, next-sibling, parent and first-child offset values can be calculated as linear positions relative to the current node. These offset values can be incorporated into the document tree in the storage locations (415), and new text-based linearized tree data with the incorporated offsets can be generated (420). For example, another in-order traversal of the document tree can be performed, this time writing out the document. At each element, the calculated previous-sibling, next-sibling, parent and first-child offset values can be written into the document tree.

Then, the document tree can be transmitted and/or saved as new text-based linearized tree data with linear offsets included (425). The included linear offsets specify relative linear positions of the nodes represented in the new text-based linearized tree data and enable random access to the represented nodes in the new text-based linearized tree data (i.e., the represented nodes can be traversed repeatedly, and in any sequence).

Figure 5:
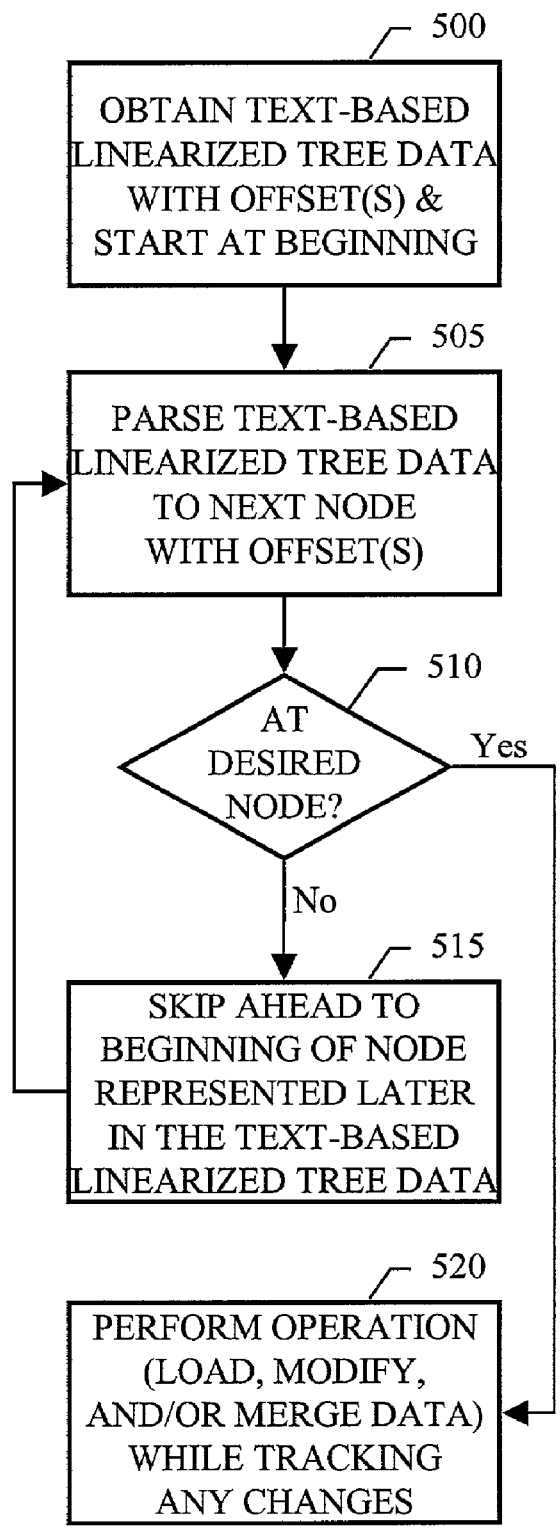
FIG. 5 is a flow chart illustrating an example method of using text-based linearized tree data with embedded offset values.

FIG. 5 is a flow chart illustrating an example method of using text-based linearized tree data with embedded offset values. The method begins by obtaining text-based linearized tree data with offsets and starting at the beginning of the data (500). The text-based linearized tree data with embedded offset values can be expressed in a text-based format that conforms to rules defined by a metalanguage, such as XML. The text-based linearized tree data is parsed until a current node with offsets is found (505).

If the current node is not a desired node (510), an offset value is used to skip ahead to the beginning of a node represented later in the text-based linearized tree data (515). Then, parsing continues. The desired node can be implicitly known given a larger context for the method of using text-based linearized tree data with embedded offset values, or the desired node can be received data, such as data received in a request for access to the desired node. Once the current node is a desired node (510), an operation is performed on the desired node (520). For example, data can be loaded, modified and/or merged.

Different sets of text-based linearized tree data can be merged together using linear offsets to improve the merger of data. For example, if data is to be placed in a certain sub-tree of another data set, this sub-tree can be located much faster, thereby shortening the time needed to complete the data merger. Moreover, any changes made to the text-based linearized tree data can be tracked, and the linear offsets can be updated based on the changes. In addition, one or more offset value integrity checks can be included and updated during changes, in order to identify when offset values have become obsolete due to a change to the text-based linearized tree data made by another process that is not aware of the linear offsets.

For example, a time-stamp and/or a total byte count can be included in the text-based linearized tree data, such that modifications that fail to update the time-stamp and/or total byte count information can be detected. In addition, other checks can be included during accessing of the text-based linearized tree data to double check that linear offsets for sub-trees remain valid. For example, in an XML implementation, if a linear offset identifies a character that is not a '<' (i.e., the beginning of an element node), this linear offset (and possibly all other linear offsets in the same data set) can be considered invalid.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A method comprising:
   obtaining an object model view in a memory of XML (eXtensible Markup Language) data of a document, the XML data comprising multiple nodes including a parent node, a child node having children thereof, and a next sibling node;
   determining a total amount of storage space needed to write in linearized form the child node, and offset value storage location, and the children of the child node from the object model view in the memory to a storage device;
   adding an attribute to a node of the XML data in the object model view in the memory, the attribute corresponding to the offset value storage location and saving a node offset value corresponding to the total amount of storage space; and
   outputting, from the object model view in the memory, the XML data, including the attribute, for writing in linearized form to the storage device;
   wherein the obtaining, the determining, the adding and the outputting are performed by a computer programmed to perform the obtaining, the determining, the adding and the outputting;
   wherein the outputting comprises writing the XML data including the attribute to a file on the storage device, the method further comprising reading the file from the storage device including skipping reading of at least a portion of the children using the node offset value.

2. The method of claim 1, wherein the adding comprises adding previous-sibling, next-sibling, parent and first-child offsets.

3. A method comprising:
   obtaining an object model view in a memory of XML (eXtensible Markup Language) data of a document, the XML data comprising multiple nodes including a parent node, a child node having children thereof, and a next sibling node;
   determining a total amount of storage space needed to write in linearized form the child node, an offset value storage location, and the children of the child node from the object model view in the memory to a storage device;
   adding an attribute to a node of the XML data in the object model view in the memory, the attribute corresponding to the offset value storage location and saving a node offset value corresponding to the total amount of storage space; and
   outputting, from the object model view in the memory, the XML data, including the attribute, for writing in linearized form to the storage device;
   wherein the obtaining, the determining, the adding and the outputting are performed by a computer programmed to perform the obtaining, the determining, the adding and the outputting;
   the method further comprising merging additional data with the XML data using the node offset value to avoid parsing a portion of the children stored on the storage device.

4. The method of claim 3, wherein the obtaining comprises:
   receiving a network data stream; and
   parsing the network data stream.

5. A machine-readable storage device embodying information indicative of instructions that cause a programmable processor to perform operations comprising:
   obtaining an object model view in a memory of XML (eXtensible Markup Language) data of a document, the XML data comprising multiple nodes including a parent node, a child node having children thereof, and a next sibling node;
   determining a total amount of storage space needed to write in linearized form the child node, an offset value storage location, and the children of the child node from the object model view in the memory to a storage device;
   adding an attribute to a node of the XML data in the object model view in the memory, the attribute corresponding to the offset value storage location and saving a node offset value corresponding to the total amount of storage space; and
   outputting, from the object model view in the memory, the XML data, including the attribute, for writing in linearized form to the storage device;
   wherein the outputting comprises writing the XML data including the attribute to a file on the storage device, the operations further comprising reading the file from the storage device including skipping reading of at least a portion of the children using the node offset value.

6. The machine-readable storage device of claim 5, wherein the adding comprises adding previous-sibling, next-sibling, parent and first-child offsets.

7. A machine-readable storage device embodying information indicative of instructions that cause a programmable processor to perform operations comprising:
   obtaining an object model view in a memory of XML (eXtensible Markup Language) data of a document, the XML data comprising multiple nodes including a parent node, a child node having children thereof, and a next sibling node;
   determining a total amount of storage space needed to write in linearized form the child node, an offset value storage location, and the children of the child node from the object model view in the memory to a storage device;
   adding an attribute to a node of the XML data in the object model view in the memory, the attribute corresponding to the offset value storage location and saving a node offset value corresponding to the total amount of storage space; and
   outputting, from the object model view in the memory, the XML data, including the attribute, for writing in linearized form to the storage device;
   the operations further comprising merging additional data with the XML data using the node offset value to avoid parsing a portion of the children stored on the storage device.

8. The machine-readable storage device of claim 7, wherein the obtaining comprises:
   receiving a network data stream; and
   parsing the network data stream.

9. A system, comprising:
   a programmable processor; and
   a memory coupled with the programmable processor and embodying information indicative of instructions that cause the programmable processor to perform operations comprising:
   obtaining an object model view in a memory of XML (eXtensible Markup Language) data of a document, the XML data comprising multiple nodes including a parent node, a child node having children thereof, and a next sibling node;

determining a total amount of storage space needed to write in linearized form the child node, an offset value storage location, and the children of the child node from the object model view in the memory to a storage device;

adding an attribute to a node of the XML data in the object model view in the memory, the attribute corresponding to the offset value storage location and saving a node offset value corresponding to the total amount of storage space; and outputting, from the object model view in the memory, the XML data, including the attribute, for writing in linearized form to the storage device;

wherein the outputting comprises writing the XML data including the attribute to a file on the storage device, the operations further comprising reading the file from the storage device including skipping reading of at least a portion of the children using the node offset value.

10. The system of claim 9, wherein the adding comprises adding previous-sibling, next-sibling, parent and first-child offsets.

11. A system comprising:

a programmable processor; and a memory coupled with the programmable processor and embodying information indicative of instructions that cause the programmable processor to perform operations comprising:

obtaining an object model view in a memory of XML (eXtensible Markup Language) data of a document, the XML data comprising multiple nodes including a parent node, a child node having children thereof, and a next sibling node;

determining a total amount of storage space needed to write in linearized form the child node, an offset value storage location, and the children of the child node from the object model view in the memory to a storage device;

adding an attribute to a node of the XML data in the object model view in the memory, the attribute corresponding to the offset value storage location and saving a node offset value corresponding to the total amount of storage space; and outputting, from the object model view in the memory, the XML data, including the attribute, for writing in linearized form to the storage device;

the operations further comprising merging additional data with the XML data using the node offset value to avoid parsing a portion of the children stored on the storage device.

12. The system of claim 11, wherein the obtaining comprises:

receiving a network data stream; and parsing the network data stream.

\* \* \* \* \*

UNITED STATES PATENT AND TRADEMARK OFFICE
CERTIFICATE OF CORRECTION

| | | |
|---|---|---|
| PATENT NO. | : 7,810,024 B1 | Page 1 of 1 |
| APPLICATION NO. | : 10/107102 | |
| DATED | : October 5, 2010 | |
| INVENTOR(S) | : Goldman | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this
Fourth Day of October, 2011

David J. Kappos
*Director of the United States Patent and Trademark Office*